Aug. 26, 1952  E. W. JOHNSON ET AL  2,608,567
PROCESS FOR MAKING ORGANOTIN COMPOUNDS
Filed Oct. 12, 1949
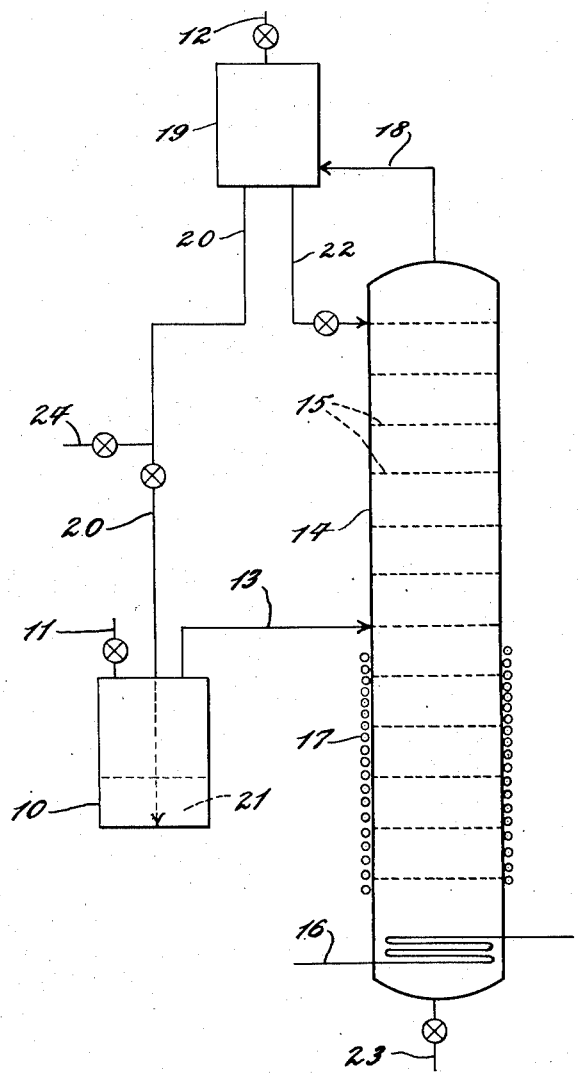
INVENTORS
Ernest W. Johnson
and James M. Church
BY
Burgess, Ryan & Hick
ATTORNEYS

UNITED STATES PATENT OFFICE

2,608,567

PROCESS FOR MAKING ORGANOTIN COMPOUNDS

Ernest W. Johnson, Mountainside, and James M. Church, Tenafly, N. J., assignors to Metal & Thermit Corporation, New York, N. Y., a corporation of New Jersey Application October 12, 1949, Serial No. 121,008

4 Claims. (Cl. 260—429)

This invention relates to processes for making organotin compounds in which the organo portion of the compounds comprises an aryl, alkyl, or aralkyl hydrocarbon radical. More particularly, it relates to processes for making organotin compounds and continuously separating a desired compound as it is formed.

An object of the invention is to provide a process for preparing mixed tin alkyls, mixed tin aryls, tin alkylaryls, mixed tin aralkyls, tin alkyl-aralkyls, and/or tin aryl-aralkyls, and for continuously separating a desired product coincidently with its formation. Other objects and advantages will be apparent hereinafter.

Generally speaking, the invention comprises a process for making tin hydrocarbon compounds of the type: $R_2R'_2Sn$, in which R and R' are alkyl, aryl or aralkyl radicals and in which R and R' are different, which comprises: heating a mixture comprising $RR'_3Sn$ and $R_3R'Sn$ to form $R_2R'_2Sn$, reducing the pressure on the mixture, continuing the heating to distill $R_2R'_2Sn$ and more volatile material from the mixture, collecting and heating the $R_2R'_2Sn$ and more volatile material to separate the latter from the $R_2R'_2Sn$, and returning the more volatile material to the mixture. For example, if $R_3R'Sn$ is the more volatile material, it will distill from the mixture along with the $R_2R'_2Sn$, leaving behind the $RR'_3Sn$. The $R_3R'Sn$ is then separated from the $R_2R'_2Sn$ by distillation and returned to the reactor where it undergoes a redistribution reaction with the $RR'_3Sn$ to form additional quantities of $R_2R'_2Sn$. In this process the said mixture comprising $RR'_3Sn$ and $R_3R'Sn$ may, as is preferable, be prepared by heating $R_4Sn$ and $R'_4Sn$, in which R and R' have the values described above.

As examples of the $R_4Sn$ and the $R'_4Sn$ there may be mentioned tin aryls such as tetraphenyltin, tetratolyltin, tetraxylyltin, etc.; tin alkyls such as tetrabutyltin, tetrapropyltin, tetraisobutyltin, tetraethyltin, tetraamyltin, tetralauryltin, and the like; tin aralkyls such as tetrabenzyltin, etc. The amounts of $R_4Sn$ and $R'_4Sn$ may suitably be equimolar. Generally, the reaction temperature will be between about 175 and about 225° C., and the pressure will be such as to enable the desired reaction product to distill at these temperatures. In practice, the pressure may be about 10 mm., more or less. In the case of higher boiling products, it is contemplated that the temperature may be greater than 225° C.

The invention may be illustrated in connection with the preparation of dibutyldiphenyltin, suitable apparatus for carrying out the process being diagrammatically shown in the drawing. One mol each of tetraphenyltin and tetrabutyltin are mixed, a small quantity of a Friedel and Crafts catalyst such as aluminum chloride added thereto, and the mass charged to reactor 10 via line 11. The reactor is provided with suitable heating means for heating the reactants to initiate the reaction. The mixture is then placed under vacuum by connecting line 12 to a suitable source of low pressure. Heating of reactor 10 is continued to maintain the mixture at reaction temperature. The amount of vacuum to be applied is variable, a suitable value being about 2.5 mm., at which pressure the distilling temperature for the mixture in reactor 10 will be about 190 to 200° C. As the reaction proceeds, tributylphenyltin, dibutyldiphenyltin, and butyltriphenyltin are formed. Tributylphenyltin and dibutyldiphenyltin distill out of the reactor as they are formed and are removed through line 13 and delivered to a fractionator 14, wherein they are separated. The butyltriphenyltin remains in the reactor 10. Fractionator 14 may be provided with conventional trays or bubble plates 15 and also with suitable pot heating means diagrammatically represented at 16, which may be electrical or which may comprise a heat exchange medium. Suitable reboiling means are also provided, such as the electrically heated resistance winding 17. The tributyl compound, which boils at about 145° C. at 2.5 mm., is taken overhead in the column 14 and delivered through line 18 to a condenser 19, where it is condensed and then passed through line 20 to reactor 10. As shown, line 20 extends below the surface of the liquid 21 in reactor 10. A portion of the tributyl compound may be returned to the column through line 22 to serve as reflux. The tributyl and the monobutyl compounds, when heated together in reactor 10, form or redistribute to the dibutyl compound. The latter must not be allowed to accumulate or else the redistribution reaction will stop. Accordingly, by removing the dibutyl compound as it is formed, and by returning the tributyl compound to the reactor, the redistribution reaction proceeds until all of the mono- and tributyl compounds are converted to the dibutyl compound, which accumulates in fractionator 14 and may be removed therefrom through line 23. Yields of substantially pure dibutyldiphenyltin of over 90% may be obtained.

If the foregoing process is performed stagewise, the tetraphenyltin and tetrabutyltin reactants are heated at about 190 to 200° C. at atmospheric or subatmospheric pressure until their conversion to the mixed butyl-phenyl compounds is substantially complete. One to three hours may be required for this stage of the process. Then the reaction mixture, while still hot, is placed under a vacuum of about 2.5 mm. to initiate the second stage. Heating of the mixture is continued to maintain it at about 190 to 200° C., and the remainder of the process is performed as described above.

In the above example, instead of starting with tetraphenyltin and tetrabutyltin to produce the dibutyldiphenyltin, a mixture of butyltriphenyltin, dibutyldiphenyltin, and tributylphenyltin may be used, as will be apparent. Also, as indicated above, butyltriphenyltin and tributylphenyltin may be heated together to form dibutyldiphenyltin, which may be distilled out as formed in the manner described. If desired, the mixed butyl-phenyl compounds formed from the tetraphenyltin and tetrabutyltin starting materials may be separated and collected. In this case the di- and tributyl compounds are distilled from the monobutyl compound, then fractionated as before, but instead of returning the tributyl compound to the reactor, it is collected as by removing it through line 24.

In order to prepare a mixed tin alkyl, for example, tetraethyltin may be reacted with tetraisobutyltin to form a mixture of diethyldiisobutyltin, triethylisobutyltin, and ethyltriisobutyltin. This mixture may then be separated as it is formed, with the triethyl and diethyl compounds distilling away from the monoethyl compound. The triethyl compound may then be distilled away from the diethyl compound in the fractionator and returned to the reactor where it undergoes redistribution with the monoethyl compound to form additional quantities of the diethyl compound. In another case, tetrabutyltin may be reacted with tetraamyltin to form a mixture of dibutyldiamyltin, butyltriamyltin, and tributylamyltin, which may then be separated on the basis of their boiling point differences.

As will be appreciated, the invention makes it possible to obtain pure compounds of the type $R_2R'_2Sn$ uncontaminated with other materials and in a high yield, which in many cases is greater than 90%.

While the invention has been described in connection with selected embodiments thereof, it will be appreciated that it is capable of obvious variations without departing from its scope.

This application is a continuation-in-part of copending application Serial Number 16,698, filed March 24, 1948.

In the light of the foregoing description, the following is claimed:

1. Process for making tin hydrocarbon compounds of the type: $R_2R'_2Sn$, in which R and R' are hydrocarbon radicals selected from the class consisting of alkyl, aryl, and aralkyl radicals and in which R and R' are different, which comprises: heating a mixture comprising $RR'_3Sn$ and $R_3R'Sn$ to produce $R_2R'_2Sn$, reducing the pressure on the reaction mixture, continuing to heat the mixture to coincidently distill the $R_2R'_2Sn$ and any more volatile material, collecting the distillate and heating it to distill off said material more volatile than $R_2R'_2Sn$, returning said volatile material to the reaction mixture, and continuing to heat and coincidently distil said mixture as described.

2. Process for making dibutyldiphenyltin which comprises: heating a mixture comprising butyltriphenyltin and tributylphenyltin to produce dibutyldiphenyltin, reducing the pressure on the reaction mixture, continuing to heat the mixture to distill the dibutyldiphenyltin and any more volatile material, collecting the distillate and heating it to distill off said material more volatile than dibutyldiphenyltin, and returning said volatile material to the reaction mixture.

3. Process according to claim 1 in which R is an alkyl radical and R' is an aryl radical.

4. Process according to claim 1 in which R and R' are dissimilar alkyl radicals.

ERNEST W. JOHNSON.
JAMES M. CHURCH.

REFERENCES CITED

The following references are of record in the file of this patent:

Calingaert et al., J. A. C. S., vol. 62, 1940, pages 1107–1110.

Calingaert et al., J. A. C. S., vol. 61, 1939, pages 2748–2754.